United States Patent
Yoon

(10) Patent No.: US 9,413,548 B2
(45) Date of Patent: Aug. 9, 2016

(54) ETHERCAT-BASED NETWORK SYSTEM AND OPERATION METHOD THEREOF

(71) Applicant: LSIS CO., LTD., Anyang-si, Gyeonggi-do (KR)

(72) Inventor: Jong Ho Yoon, Hwaseong-si (KR)

(73) Assignee: LSIS CO., LTD., Anyang-si (KR)

( * ) Notice: Subject to any disclaimer, the term of this patent is extended or adjusted under 35 U.S.C. 154(b) by 614 days.

(21) Appl. No.: 13/649,061

(22) Filed: Oct. 10, 2012

(65) Prior Publication Data

US 2013/0097273 A1    Apr. 18, 2013

(30) Foreign Application Priority Data

Oct. 18, 2011    (KR) ........................ 10-2011-0106335

(51) Int. Cl.
*G06F 15/16* (2006.01)
*H04L 12/40* (2006.01)
*G05B 19/042* (2006.01)

(52) U.S. Cl.
CPC .......... *H04L 12/40* (2013.01); *H04L 12/40169* (2013.01); *G05B 19/042* (2013.01); *H04L 2012/4026* (2013.01)

(58) Field of Classification Search
CPC .............. H04L 12/40; H04L 12/40169; H04L 2012/4026; H04L 12/4625; H04L 12/2803
USPC ................................... 709/208; 710/105, 110
See application file for complete search history.

(56) References Cited

U.S. PATENT DOCUMENTS

| | | | | |
|---|---|---|---|---|
| 6,138,201 | A * | 10/2000 | Rebalski | 711/4 |
| 6,581,117 | B1 * | 6/2003 | Klein et al. | 710/110 |
| 2004/0054829 | A1 | 3/2004 | White, III et al. | |
| 2008/0080521 | A1 * | 4/2008 | Sichner et al. | 370/400 |

(Continued)

FOREIGN PATENT DOCUMENTS

| | | |
|---|---|---|
| CN | 1367429 | 9/2002 |
| CN | 101065714 | 10/2007 |
| JP | 2006-302297 | 11/2006 |

OTHER PUBLICATIONS

Lei Wang ; Huijuan Jia ; Junyan Qi ; Bin Fang, The construction of soft servo networked motion control system based on EtherCAT, Jul. 17-18, 2010, IEEE, Environmental Science and Information Application Technology (ESIAT), 2010 International Conference on (vol. 3), pp. 356-358.*

(Continued)

*Primary Examiner* — June Sison
*Assistant Examiner* — Dixon Dabipi
(74) *Attorney, Agent, or Firm* — Lee, Hong, Degerman, Kang & Waimey PC; Jonathan Kang; Justin Lee

(57) ABSTRACT

An EtherCAT-based network system configured to change a PDO list set, and an operation method thereof are provided, the system including at least one or more slave devices, a master device configured to connect and operate the slave device in response to an operating transmission PDO list or an operating reception PDO list provided from outside, and a host computer configured to extract the operating transmission PDO list or the operating reception PDO list from information file of the slave device and provide to the master device, wherein the information file includes at least one of identity information of the slave device, PDO list item changeable information, at least one or more transmission PDO list, and at least one or more reception PDO list.

12 Claims, 9 Drawing Sheets

(56) References Cited

U.S. PATENT DOCUMENTS

2008/0313299 A1* 12/2008 Ebbe et al. .................. 709/208
2010/0166022 A1* 7/2010 Cho ............................. 370/503
2010/0306511 A1* 12/2010 Mochizuki et al. .......... 712/225
2011/0184533 A1* 7/2011 Maruyama et al. ............. 700/3

OTHER PUBLICATIONS

Seno, L.; Zunino, C., A simulation approach to a Real-Time Ethernet protocol: EtherCAT, Sep. 15-18, 2008, IEEE, IEEE International Conference on Emerging Technologies and Factory Automation, 2008. ETFA 2008., pp. 440-443.*

Festo AG & Co. KG, D-73726 Esslingen, EtherCAT for motor controllers CMMP-AS, 2009, Festo P.B.E-CMMX-EC-SW-EN en 0912NH, 570924, pp. I-A3.*

Japan Patent Office Application Serial No. 2012-225249, Office Action dated Dec. 17, 2013, 2 pages.

Motohiro, "Features and future prospects of Realtime protocol [Ethernet Powerlink]," Industrial Technical Co., Ltd., vol. 48, No. 12, Dec. 2005, 7 pages.

European Patent Office Application Serial No. 12187943.1, Search Report dated Feb. 7, 2013, 5 pages.

The State Intellectual Property Office of the People's Republic of China Application Serial No. 201210396812.3, Office Action dated Jan. 15, 2015, 6 pages.

* cited by examiner

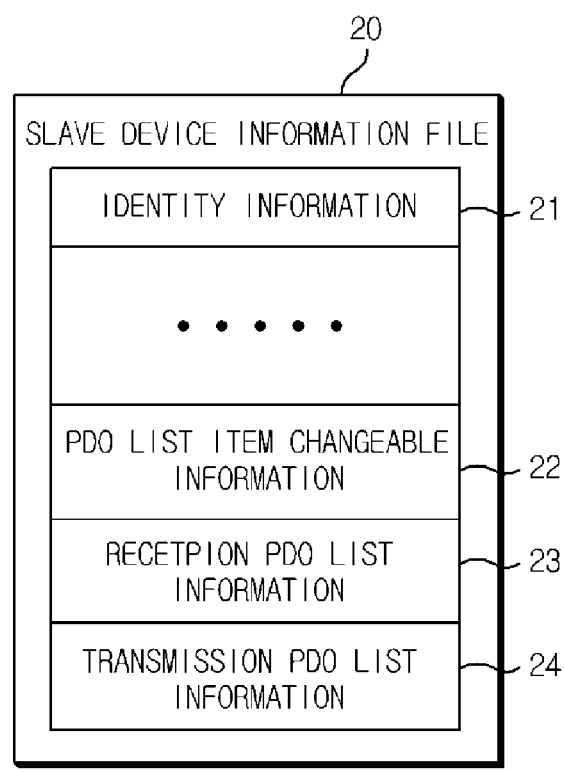

FIG. 2B
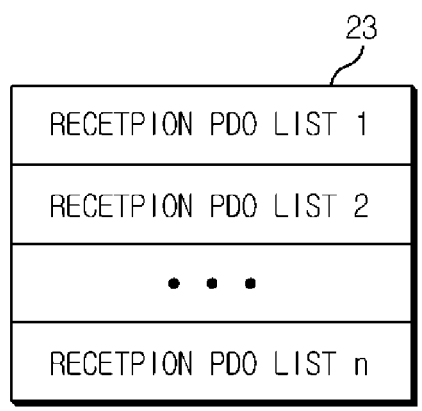
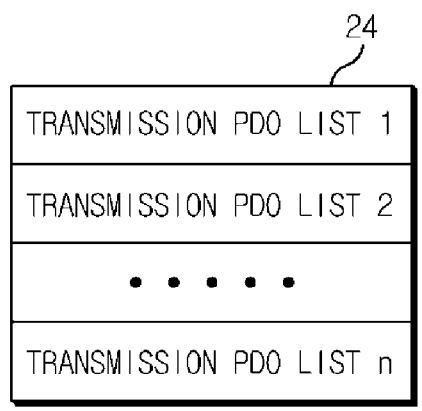

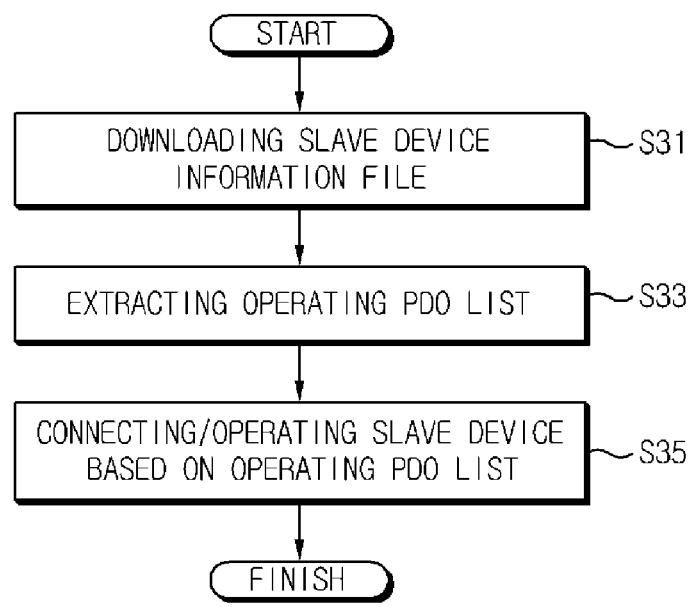

ETHERCAT-BASED NETWORK SYSTEM AND OPERATION METHOD THEREOF

Pursuant to 35 U.S.C.§119 (a), this application claims the benefit of earlier filing date and right of priority to Korean Patent Application No. 10-2011-0106335, filed on Oct. 18, 2011, the contents of which are hereby incorporated by reference in their entirety.

BACKGROUND OF THE DISCLOSURE

1. Field of the Disclosure

The present disclosure relates to an EtherCAT-based Network system and operation method thereof, and more particularly to an EtherCAT-based Network system configured to automatically extract a PDO list for operation of slave device, and an operation method thereof.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

The application of Ethernet (registered trademark; hereinafter omitted)-based communication protocol system is rapidly expanded in the industrial communication network used in the factory automation, process control facilities, building automation and infrastructure areas.

Particularly, application of industrial Ethernet (Ethernet used in the system for industrial use is generally called "industrial Ethernet") developed for need of production automation system is widely expanded to all industrial fields including process automation, power IT and motion fields. The industrial Ethernet, which is based on an Ethernet technology, has a function of realizing real-time response performance required in the system for industrial use.

On international fields, ten or more different standards including Ethernet/Internet Protocol, Profinet, EtherCAT (Ethernet for Control Automation Technology) have been created by various standards groups including IEC (International Electrotechnical Commission) in order to pre-occupy the markets.

Particularly, Ethernet protocol of full duplex Ethernet physical layers is a real-time industrial network that has gained much attention recently. The reason is that the Ethernet protocol provides fully opened technology, and uses Ethernet frames with excellent compatibility. Furthermore, in comparison with the conventional fieldbus (industrial network), the Ethernet protocol can be advantageously realized with relatively low expenses due to use of low-cost NICs (Network Interface Cards).

Data frames are transmitted from a master device in the EtherCAT protocol transmission method of broadcast type. Each slave device connected to the master device receives the data frames, analyzes and processes the data frames, and transmits the analyzed and processed data frames to the slave devices.

That is, each slave device in the EtherCAT protocol receives data by reading the data transmitted to a relevant slave device during data frame transmittal, inserts data to be transmitted and transmits the data to a next slave device, where PDO (Process Data Object) may be used for transmission of received/transmitted data between the master device and the slave devices.

Generally, data item forming the PDO is manually set and changed by using tools for setting the slave devices. As a result, user inconvenience increases, and particularly, in a case slave devices are supplied from various manufacturers, a user must disadvantageously select each PDO data item relative to hosts of slave devices to take excessive time for installation of slave devices. Another disadvantage is that erroneous operation of slave devices and generation of errors due to user's erroneous PDO setting may occur.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides an EtherCAT-based network system configured to allow a host computer to automatically generate a PDO list for operating slave devices, and configured to allow a master device to automatically connect and operate a slave device corresponding to the operation PDO list, and an operation method thereof.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an EtherCAT-based network system configured to change a PDO list set, the system comprising: at least one or more slave devices; a master device configured to connect and operate the slave devices in response to an operating transmission PDO list or an operating reception PDO list; and a host computer configured to extract the operating transmission PDO list or the operating reception PDO list from information file of the slave devices and provide to the master device, wherein the information file includes at least one of identity information of the slave devices, PDO list item changeable information, at least one or more transmission PDO list, and at least one or more reception PDO list.

In some exemplary embodiments, the host computer retrieves the transmission PDO list or the reception PDO list and extracts the operating transmission PDO list or the operating reception PDO list, in a case an essential PDO item is present.

In some exemplary embodiments, in a case an essential PDO item is present, and by determining the PDO list item changeable information, the host computer generates the operating transmission PDO list or the operating reception PDO list by changing an item of the transmission PDO list or the reception PDO list, in a case a PDO item is changeable, and selects any one of the transmission PDO list or the reception PDO list as the operating transmission PDO list or the operating reception PDO list, in a case a PDO item is unchangeable.

In some exemplary embodiments, the host computer generates the operating transmission PDO list or the operating reception PDO list by adding at least one of an essential PDO item, an auxiliary PDO item or a selection PDO item preset in the transmission PDO list or the reception PDO list, in a case a PDO item is changeable.

In some exemplary embodiments, the host computer compares the number of the auxiliary PDO items, the number of selection PDO items and data size of PDO items, each included in the transmission PDO list or the reception PDO list, with each predetermined reference condition, in a case a PDO item is unchangeable, to select any one of the transmission PDO list or the reception PDO list as the operating transmission PDO list or the operating reception PDO list.

In some exemplary embodiments, the master device connects and operates a relevant slave device, in a case a slave device possessing the operating transmission PDO list or the operating reception PDO list is present.

In some exemplary embodiments, the master device downloads the operating transmission PDO list or the operating reception PDO list corresponding to identity information of the slave device, to the slave device, and connects and operates the slave device, in a case a slave device possessing the operating transmission PDO list or the operating reception PDO list is absent.

In another general aspect of the present disclosure, there is provided an operation method of EtherCAT-based network system configured to change a PDO list set, the method comprising: extracting, by a host computer, an operating transmission PDO list or an operating reception PDO list from information file of slave devices; providing to a master device the operating transmission PDO list or the operating reception PDO list extracted by the host computer; connecting and operating, by the master device, a slave device corresponding to the operating transmission PDO list or the operating reception PDO list, wherein the information file includes at least one of identity information of the slave devices, PDO list item changeable information, at least one or more transmission PDO list, and at least one or more reception PDO list.

In some exemplary embodiments, the step of extracting the operating transmission PDO list or the operating reception PDO list includes, retrieving, by the host computer, the operating transmission PDO list or the operating reception PDO list to determine whether an essential PDO item is present, and extracting the operating transmission PDO list or the operating reception PDO list, in a case the essential PDO item is present as a result of determination.

In some exemplary embodiments, the step of extracting the operating transmission PDO list or the operating reception PDO list includes, determining, by the host computer, the PDO item changeable information, and generating the operating transmission PDO list or the operating reception PDO list by changing items of the operating transmission PDO list or the operating reception PDO list, in a case the PDO item is changeable as a result of determination, and selecting any one of the transmission PDO list or the reception PDO list as the operating transmission PDO list or the operating reception PDO list, in a case a PDO item is unchangeable.

In some exemplary embodiments, the host computer generates the operating transmission PDO list or the operating reception PDO list by adding at least one of an essential PDO item, an auxiliary PDO item or a selection PDO item, each present in the transmission PDO list or the reception PDO list, in a case a PDO item is changeable.

In some exemplary embodiments, the host computer compares the number of the auxiliary PDO items, the number of selection PDO items and data size of PDO items included in the transmission PDO list or the reception PDO list, with each predetermined reference condition, in a case a PDO item is unchangeable, to select any one of the transmission PDO list or the reception PDO list as the operating transmission PDO list or the operating reception PDO list.

In some exemplary embodiments, the step of connecting and operating, by the master device, a slave device corresponding to the operating transmission PDO list or the operating reception PDO list includes connecting and operating, by the master device, a relevant slave device, in a case a slave device possessing the operating transmission PDO list or the operating reception PDO list is present.

In some exemplary embodiments, the step of connecting and operating, by the master device, a slave device corresponding to the operating transmission PDO list or the operating reception PDO list includes, downloading, by the master device, the operating transmission PDO list or the operating reception PDO list corresponding to identity information of the slave device, to the slave device, and connecting and operating the slave device, in a case a slave device possessing the operating transmission PDO list or the operating reception PDO list is absent.

The present disclosure has an advantageous effect in that a user is free from selection and download of an operating PDO list from information file provided for each slave device, because a host computer generates the operating PDO list for operation of the slave device and connecting and operating a slave device corresponding to the operating PDO list.

Another advantageous effect is that the user can prevent an erroneous operation of the slave device caused by user's erroneous installation and generation of errors.

Still another advantageous effect is that even if slave devices are supplied by various manufacturers, time and expenses for installation of the slave devices can be reduced because the slave devices are automatically connected and operated by a host computer and a master device.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinafter by way of illustration only, and thus are not limitative of the present disclosure, and wherein:

FIGS. 2a and 2b are schematic views illustrating an information file structure of a slave device according to an exemplary embodiment of the present disclosure;

FIG. 3 is a flowchart illustrating an operation method of an EtherCAT-based Network system according to an exemplary embodiment of the present disclosure;

Figure 1:
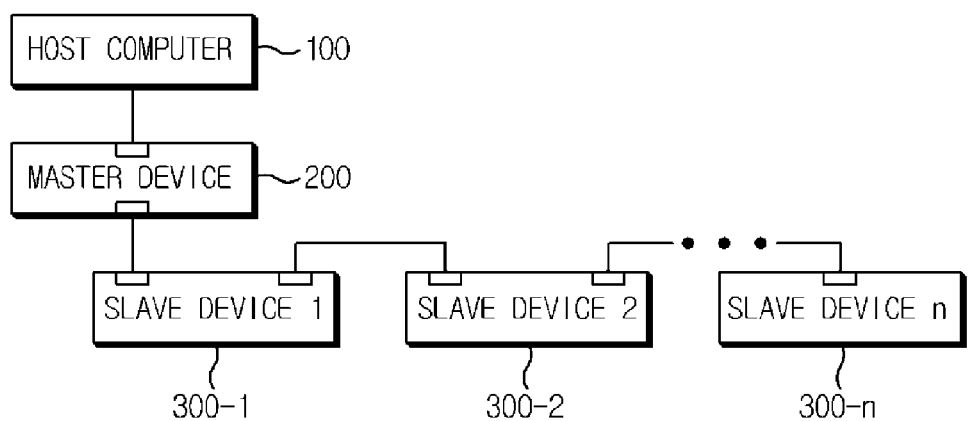
FIG. 1 is a schematic block diagram illustrating an EtherCAT-based Network system according to an exemplary embodiment of the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' 'device' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part", "device" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

FIG. 1 is a schematic block diagram illustrating an EtherCAT-based Network system according to an exemplary embodiment of the present disclosure.

Referring to FIG. 1, an EtherCAT-based Network system according to an exemplary embodiment of the present disclosure includes a host computer (100), a master device (200) and at least one or more slave devices (300-1, 300-2, ... 300-n). The host computer (100) can perform a data communication with the master device (200) via a communication cable, and a communication cable is connected to the slave devices (300-1, 300-2, ... 300-n) via a communication cable to mutually enable transmission and reception of data.

The host computer (100) is mounted with installation software for operation of the EtherCAT-based Network system. The installation software may extract an operating PDO list including PDO (Process Data Object), which is data for transmission and reception between the master device (200) and the slave devices (300-1, 300-2, ... 300-n), where the operating PDO list means an operating transmission PDO list or an operating reception PDO list, such that the operating transmission PDO list or the operating reception PDO list are commonly called an operating PDO list hereinafter.

The extracted operating PDO list is supplied to the master device (200), whereby the master device (200) can automatically control operation modes of the slave devices (300-1, 300-2, ... 300-n) corresponding to the operating PDO list.

The master device (200) functions to control the slave devices (300-1, 300-2, ... 300-n), and may be a motion controller, for example. The master device (200) may be equipped with a dual Ethernet port, receive a variety of data necessary for operation of the slave devices (300-1, 300-2, ... 300-n) from the host computer (100), and connect/operate a slave device corresponding to the operating PDO list extracted by the host computer (100).

The slave devices (300-1, 300-2, ... 300-n) may receive control of the master device (200) to drive various load devices, and may be serve drives for driving a motor, which is a load device, for example. The slave device (300-1) connected to the master device (200) receives data, analyzes/processes the data, and transmits the analyzed/processed data to a next slave device (300-2). The data transmission/reception thus explained is realized among the slave devices.

In the EtherCAT-based Network system according to an exemplary embodiment of the present disclosure, a master device controls at least one or more slave devices, where each slave device may be manufactured by a different manufacturer. Thus, a manufacturer of a slave device generally provides information file (e.g., ESI, EtherCAT Slave Information) of each slave device.

The information file of the slave device may be provided in an XML file format, and a schematic structure of the information file is illustrated in FIG. 2a. Referring to FIG. 2a, the information file may include an identity information (21) of a relevant slave device, PDO list item changeable information (22), reception PDO list information (23) and transmission PDO list information (24).

The identity information (21) of the slave device may indicate manufacturer information and product information. The PDO list item changeable information (22) is information showing whether PDO items included in the PDO list can be changed. Due to the fact that changeability of the PDO list items can be set based on manufacturer of the slave devices, the information file includes information thereof.

The reception PDO list information (23) and the transmission PDO list information (24) are included with at least one or more reception PDO lists and transmission PDO lists, as shown in FIG. 2b. These reception or transmission PDO lists are provided in correspondence to an operation mode of the slave device.

For example, in case the slave device is a servo driver, an operating mode includes a position mode, a speed mode and a torque mode, and reception PDO list or transmission PDO list is included in the reception PDO list information (23) or the transmission PDO list information (24) for each of the position mode, the speed mode and the torque mode, The reception or transmission PDO list includes a plurality of PDO items, where the PDO item includes an essential PDO item necessary for operation of the slave device, an auxiliary PDO item and a selection PDO item for providing a user interface.

Any one of the essential PDO item, the auxiliary PDO item or the selection PDO item is included in the reception PDO list or the transmission PDO list, and the essential PDO item, the auxiliary PDO item or the selection PDO item may be differently set according to specification of master device and operating mode supported by the master device.

For example, in a case an operating mode of the servo driver is a position mode, information on a moving distance of a motor (i.e., load device) is stored in the essential PDO item, and side information for indicating an installation screen on the host computer may be stored in the auxiliary PDO item or the selection PDO item. Another example is that in a case an operating mode of the servo driver is a speed mode, information on rotation speed of a load device (i.e., motor) may be stored as essential PDO item.

An information file of the slave devices (300-1, 300-2, . . . 300-n) having the above mentioned file structure is read from the host computer (100), where the host computer (100) uses various information included in the information file to extract the operating PDO list, and the master device (200) controls/operates the slave devices (300-1, 300-2, . . . 300-n) according to the operating PDO list.

The operating PDO list is extracted by using the information file of the slave devices (300-1, 300-2, . . . 300-n), where the operating PDO list is extracted in a smaller or equal number than that of the slave devices.

Hereinafter, an operation method of EtherCAT-based network system according to exemplary embodiments of the present invention, a process of how a host computer (to be more specific, the installed software) to extract the operating PDO list from the information file of the slave devices and a process of connecting/operating the slave devices, by the master device, in response to the operating PDO list will be described with reference to the accompanying drawings.

Furthermore, it is to be noted that hereinafter, the PDO list means a transmission PDO list or a reception PDO list, and the operating PDO list means an operating transmission PDO list or an operating reception PDO list.

FIG. 3 is a flowchart illustrating an operation method of an EtherCAT-based Network system according to an exemplary embodiment of the present disclosure.

Referring to FIG. 3, first, a host computer reads information file received on each slave device (S31) in the operation method of EtherCAT-based network system according to exemplary embodiments of the present invention. The host computer extracts an operating (operation) PDO list to be provided to the master device by using identity information of the slave device included in the information file of the slave device, PDO list item changeable information, transmission PDO list, and reception PDO list (S33).

The master device having received the operating PDO list extracted in S33 connects/operates a slave device relevant to the operating PDO list (S35). Now, hereinafter, the step of S33 will be described with reference to FIGS. 4 and 5 in more detail, and the step of S35 will be described with reference to FIG. 7 in more detail.

Figure 4:
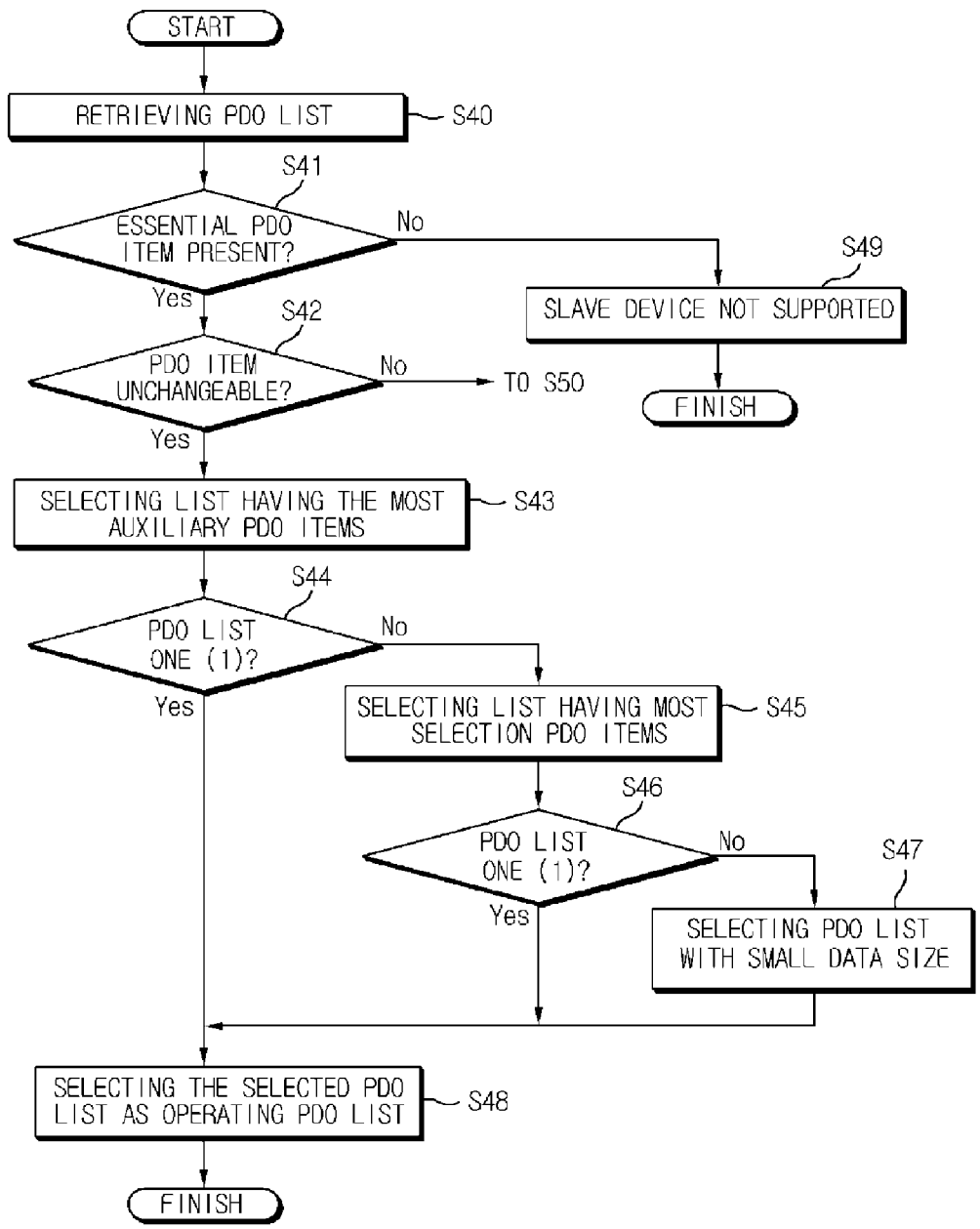
FIGS. 4 and 5 are flowcharts illustrating a process of extracting an operating PDO list in an operation method of EtherCAT-based network system according to an exemplary embodiment of the present disclosure.
Figure 5:
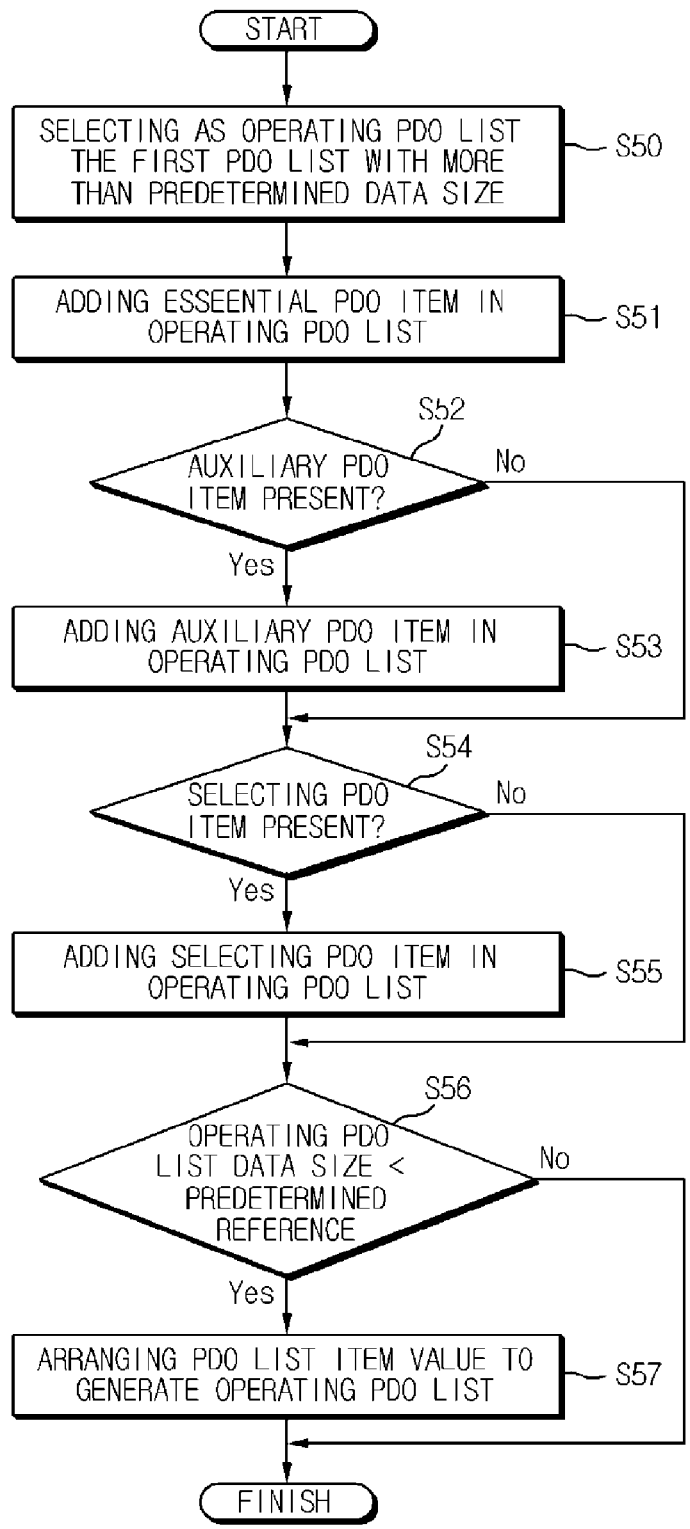

FIGS. 4 and 5 are flowcharts illustrating a process of extracting an operating PDO list in an operation method of EtherCAT-based network system according to an exemplary embodiment of the present disclosure, where the step of S33 of extracting, by the host computer, the operating PDO list will be described.

The host computer having read the information file of the slave device retrieves the PDO list in the information file (S40). As a result of the retrieval, whether an essential PDO item is present in the PDO list is determined (S41). As noted, the essential PDO item may be differently set according to specification of master device and an operation mode supported by the master device.

As a result of the determination at S41, if it is determined that an essential PDO item is absent in the PDO list, the host computer determines that the relevant slave device is a slave device that is not supported by the master device, and may display on a screen of the host computer a type of error message showing "a slave device not supported by the master device" (S49).

As a result of the determination at S41, if it is determined that an essential PDO item is present in the PDO list, the relevant slave device, is determined as a slave device that is supported by the master device and a process of extracting the operating PDO list is performed. In order to extract the operating PDO list, the host computer determines whether the PDO list item can be changed using the PDO list item changeable information (S42).

As a result of determination at S42, if it is determined that the PDO list item cannot be changed, a PDO list having the largest number of auxiliary PDO items is selected (S43), and determination is made whether the selected PDO list is one (1) (S44). As a result of determination at S44, if it is determined that the selected PDO list is one (1), the selected PDO list is selected as an operating PDO list (S48). As a result of determination at S44, if it is determined that the selected PDO list is not one (1), a PDO list having the largest number of selected PDO items is selected (S45), and determination is made whether the selected PDO list is one (1) (S46).

As a result of determination at S46, if it is determined that the selected PDO list is one (1), the selected PDO list is selected as an operating PDO list (S48). As a result of determination at S46, if it is determined that the selected PDO list is not one (1), a PDO list having a smallest data size is selected (S47). Next, the PDO list selected from S47 is selected as the operating PDO list (S48).

That is, the present disclosure is such that, in case of a PDO list item information being unchangeable slave device, any one PDO list included in the information file of the slave device is selected as an operating PDO list, and the number of auxiliary PDO items, the number of selected PDO items and data size of PDO list are used as a selection reference. Meanwhile, the selection reference in FIG. 4 is simply an example, such that the selection reference may be variably changed. As a result, in case of a PDO list item information being unchangeable slave device, the process of S33 in FIG. 3 of extracting the operating PDO list is finished, because the operating PDO list is selected at S48.

Meanwhile, as a result of determination at S42, if it is determined that the PDO list item is changeable, flow advances to S60, a detailed description of which will be provided in FIG. 5.

Referring to FIG. 5, in case of a PDO list item unchangeable slave device, the host computer retrieves the PDO list included in the information file of the slave device, and selects as the operating PDO list a first-retrieved PDO list having more than a predetermined size (S50), where the predetermined size may be set according to specification of the master device.

The host computer adds an essential PDO item to the operating PDO list selected by S50 (S51). Based on S41 of FIG. 4, the PDO list is included with the essential PDO item, such that a new essential PDO item can be added, in a case the existing essential PDO item is maintained, or in a case the existing essential PDO item is changed. The essential PDO item added in S51 may be pre-set according to an operation mode supported by the master device.

Successively, the host computer determines whether an auxiliary PDO item is present in the operating PDO list (S52). As a result of determination at S52, if the auxiliary PDO item is present in the operating PDO list, the operating PDO list is added by the auxiliary PDO item (S53). At S53, a new auxiliary PDO item can be added, in a case the existing auxiliary PDO item is maintained, or in a case the existing auxiliary PDO item is changed. The auxiliary PDO item added in S53 may be pre-set according to an operation mode supported by the master device.

As a result of determination at S52, if the auxiliary PDO item is absent in the operating PDO list, or the process of addition of the auxiliary PDO item is finished at S53, the host computer determines whether the selected PDO item is present in the operating PDO list (S54). As a result of determination at S54, if the selected PDO item is present, the operating PDO list is added by the selection PDO item (S55). At S55, a new selection PDO item can be added, in a case the existing selection PDO item is maintained, or in a case the existing selection PDO item is changed. The selection PDO item added in S55 may be pre-set according to an operation mode supported by the master device.

As a result of determination at S54, if the selection PDO item is absent in the operating PDO list, or the process of adding the selection PDO list is finished at S55, the host computer compares a data size of the operating PDO list with a predetermined existing data size (S56).

As a result of determination at S56, if it is determined that the data size of the operating PDO list is smaller than the predetermined existing data size, a PDO list item value arranging process is performed by the host computer, in which a data value of "0" is added to the operating PDO list to make the data size of the operating PDO list equal to the predetermined existing data size, and the host computer generates a final operating PDO list where the item value is arranged (S57).

As a result of determination at S56, if it is determined that the data size of the operating PDO list is not smaller than the predetermined existing data size, the item value arranging process is omitted to generate the operating PDO list as the final operating PDO list.

As noted from the foregoing, in case of a PDO list item information changeable slave device, the PDO list included in the information file of the slave device is added with at least any one of the pre-set essential PDO item, the pre-set auxiliary PDO item and the pre-set selection PDO item according to the operation mode supported by the master device to generate the operating PDO list, whereby S33 of FIG. 3, the step of extracting the operating PDO list can be finished.

Figure 6A:
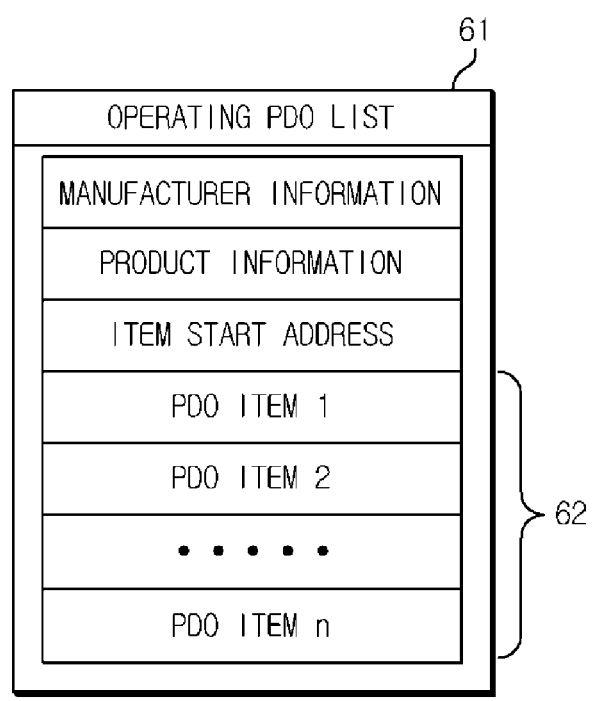
FIGS. 6a and 6b are schematic views illustrating data structure of an operating PDO list according to an exemplary embodiment of the present disclosure.
Figure 6B:
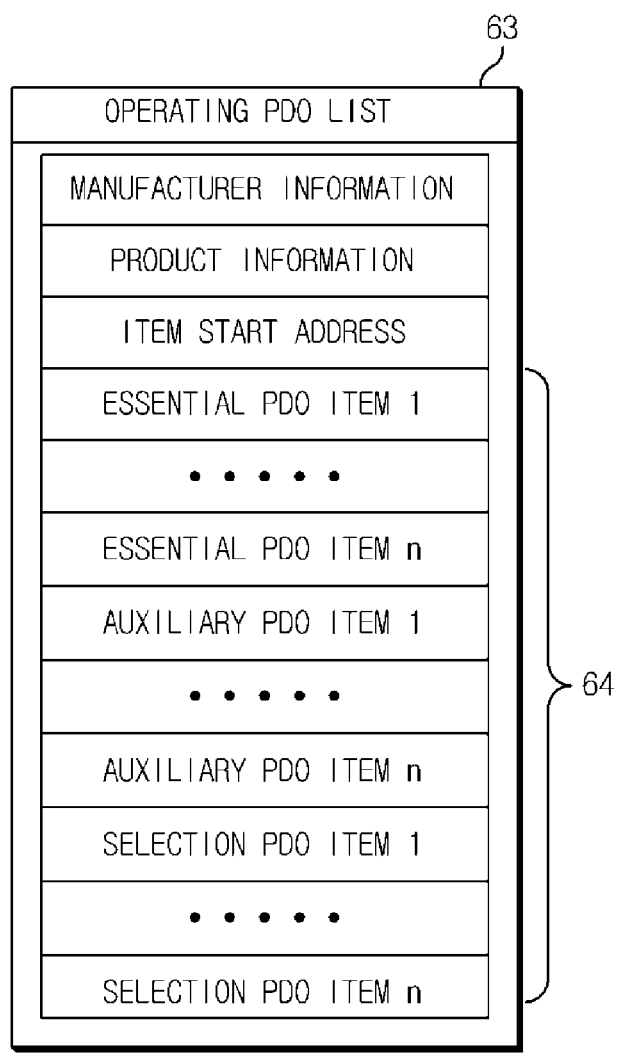

FIGS. 6a and 6b are schematic views illustrating data structure of an operating PDO list according to an exemplary embodiment of the present disclosure, where FIG. 6a illustrates an operating PDO list of a PDO list item information unchangeable slave device, and FIG. 6b illustrates an operating PDO list of a PDO list item information changeable slave device.

An operating PDO list (61) of FIG. 6a is selected from the PDO list provided to the information file of the slave device, where a plurality of PDO items (62) included in the operating PDO list (61) show PDO items provided to the information file. An operating PDO list (63) of FIG. 6b is where items of PDO list are changed, and includes a PDO item structure preset in response to the operation mode supported by the master device. A changed PDO item (64) in response to the preset PDO item structure may include a plurality of essential PDO items, a plurality of auxiliary PDO items and a plurality of selection PDO items, where the illustrated PDO structure is just an example, and particularly, the auxiliary PDO items and the selection PDO items may be changed in response to the slave device.

Figure 7:
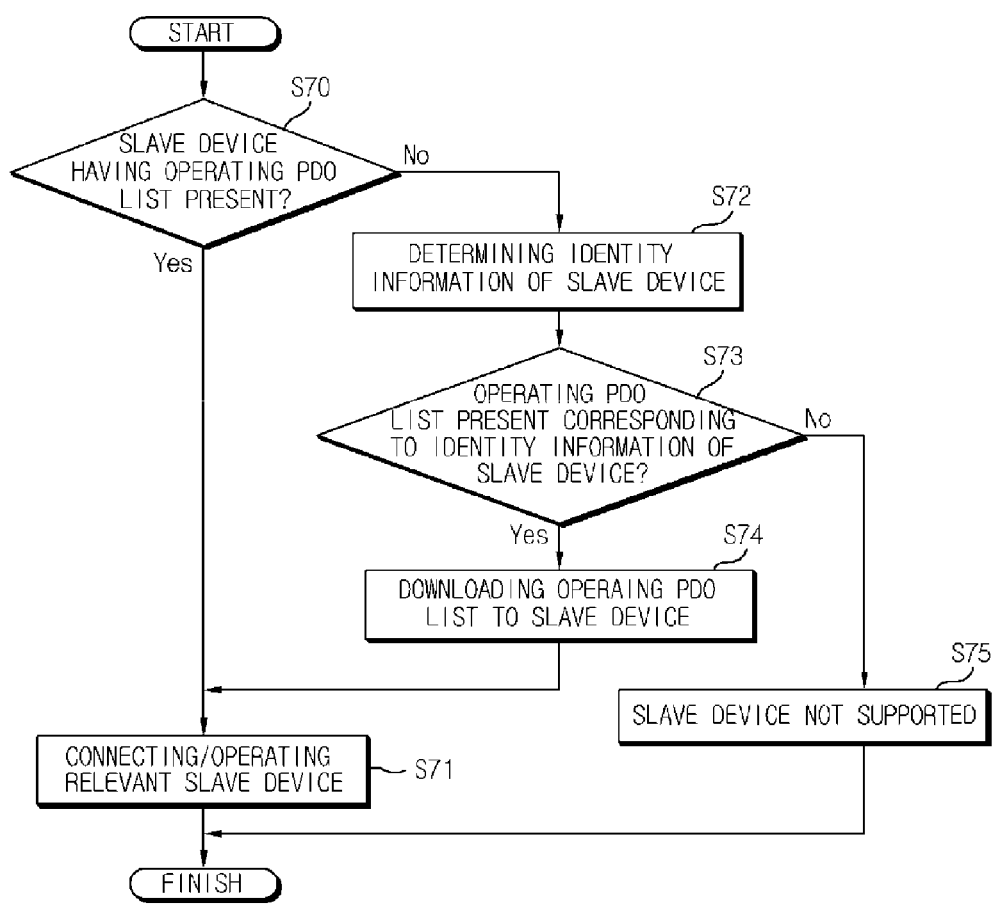
FIG. 7 is a flowchart illustrating a connection process of a slave device based on an operating PDO list according to an exemplary embodiment of the present disclosure.

FIG. 7 is a flowchart illustrating a connection process of a slave device based on an operating PDO list in an operation method of EtherCAT-based network system according to an exemplary embodiment of the present disclosure, which is an example of S35.

Referring to FIG. 7, a master device determines whether a slave device having an operating PDO list provided from a host computer is present (S70).

As a result of determination at S70, if it is determined that a slave device having an operating PDO list provided from a host computer is present, the master device connects/operates a relevant slave device (S71). The case of a slave device having an operating PDO list provided from a host computer being present may mean a case where any one of PDO lists included in the information file of the slave device is selected without changing the PDO list item as the operating PDO list (That is, a case corresponding to FIG. 4).

As a result of determination at S70, if it is determined that a slave device having an operating PDO list provided from a host computer is absent, the master device determines identity information of the slave device (S72), and retrieves whether an operating PDO list corresponding to the identity information of the slave device is present (S73).

The case of the slave device having an operating PDO list provided from a host computer being absent is a case where host computer changes the PDO list item to generate the operating PDO list (that is, the case of FIG. 5), such that master device may uses the identity information (e.g., manufacturer information, product information, etc) included in the operating PDO list to retrieve a relevant operating PDO list.

As a result of determination at S73, if it is determined that an operating PDO list corresponding to the identity information of the slave device is present, the master device downloads the operating PDO list to the slave device (S74) and connects/operates a relevant slave device (S71). As a result of determination at S73, if it is determined that an operating PDO list corresponding to the identity information of the slave device is absent, which corresponds to a slave device not supported by the master device, the master device may generate a kind of error message showing "a slave device not supported by the master device" to finish the control of relevant slave device (S75).

As apparent from the operation method of EtherCAT-based network system according to an exemplary embodiment of the present disclosure has an industrial applicability in that the host computer generates an operating PDO list, and the master device connects/operates a slave device corresponding to the operating PDO list, whereby a user needs not select and download the operating PDO list from the information file provided for each slave device to enhance a user convenience, to prevent an erroneous operation of the slave device caused by erroneous installation by the user and the generation of errors, and even if slave devices are supplied by various manufacturers, time and expenses for installation of the slave devices can be reduced, because the slave devices are automatically connected and operated by a host computer and a master device.

The above-mentioned EtherCAT-based network system and operation method thereof according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. An EtherCAT-based network system comprising:
   one or more slave devices, wherein the one or more slave devices are host computers;
   a master device configured to connect to and operate the slave devices in response to an operating transmission PDO (Process Data Object) list or an operating reception PDO list, wherein the master device is a host computer; and
   a host computer configured to extract the operating transmission PDO list or the operating reception PDO list from an information file of the slave devices and provide the extracted list to the master device,
   wherein the information file includes identity information of the slave devices, PDO list item changeable information, one or more transmission PDO lists, and one or more reception PDO lists,
   wherein the transmission PDO list and the reception PDO list include an essential PDO item, an auxiliary PDO item, or a selection PDO item, and
   wherein the host computer is further configured to
   retrieve the transmission PDO list or the reception PDO list;
   determine whether the essential PDO item is present in the retrieved PDO list;
   determine the PDO item changeable information when the essential PDO item is present;
   select a PDO list having a largest number of auxiliary PDO items;
   determine if a number of the selected PDO list is one; and
   extract the selected PDO list as the operating PDO list when the number of the selected PDO list is one.

2. The system of claim 1, wherein the host computer is further configured to:
   generate the operating transmission PDO list or the operating reception PDO list by changing an item of the transmission PDO list or the reception PDO list when a PDO item is changeable; and
   select the transmission PDO list or the reception PDO list as the operating transmission PDO list or the operating reception PDO list when a PDO item is unchangeable.

3. The system of claim 2, wherein changing an item of the operating transmission PDO list or the operating reception PDO list comprises adding at least an essential PDO item, an auxiliary PDO item or a selection PDO item present in the transmission PDO list or the reception PDO list.

4. The system of claim 2, wherein selecting the transmission PDO list or the reception PDO list comprises comparing a number of auxiliary PDO items, a number of selection PDO items and a data size of each of the PDO items included in the transmission PDO list or the reception PDO list with predetermined reference conditions when the PDO item is unchangeable.

5. The system of claim 1, wherein connecting to and operating the slave devices comprises connecting to and operating a relevant slave device when a slave device possessing the operating transmission PDO list or the operating reception PDO list is present.

6. The system of claim 1, wherein the master device is further configured to:
   download the operating transmission PDO list or the operating reception PDO list corresponding to identity information of a slave device to the corresponding slave device when a slave device possessing the operating transmission PDO list or the operating reception PDO list is not present; and
   connect to and operate the corresponding slave device.

7. An operation method of an EtherCAT-based network system configured to, the method comprising:
   extracting, by a host computer, an operating transmission PDO (Process Data Object) list or an operating reception PDO list from an information file of slave devices and providing the extracted list to a master device; and
   connecting, by the master device, to and operating a slave device corresponding to the operating transmission PDO list or the operating reception PDO list,
   wherein the information file includes identity information of the slave devices, PDO list item changeable information, one or more transmission PDO lists, and one or more reception PDO lists,
   wherein the transmission PDO list and the reception PDO list include an essential PDO item, an auxiliary PDO item or a selection PDO item, and
   wherein extracting the operating transmission PDO list or the operating reception PDO list comprises:
   retrieving the transmission PDO list or the reception PDO list;
   determining whether the essential PDO item is present in the retrieved PDO list;
   determining the PDO item changeable information when the essential PDO item is present;
   selecting a PDO list having a largest number of auxiliary PDO items;
   determining if a number of the selected PDO list is one; and
   extracting the selected PDO list as the operating PDO list when the number of the selected PDO list is one.

8. The method of claim 7, further comprising the host computer:
   generating the operating transmission PDO list or the operating reception PDO list by changing items of the operating transmission PDO list or the operating reception PDO list when a PDO item is changeable; and
   selecting the transmission PDO list or the reception PDO list as the operating transmission PDO list or the operating reception PDO list when a PDO item is unchangeable.

9. The method of claim 8, wherein changing items of the operating transmission PDO list or the operating reception PDO list comprises adding at least an essential PDO item, an auxiliary PDO item or a selection PDO item present in the transmission PDO list or the reception PDO list.

10. The method of claim 8, wherein selecting the transmission PDO list or the reception PDO list comprises comparing a number of auxiliary PDO items, a number of selection PDO items and a data size of each of the PDO items included in the transmission PDO list or the reception PDO list with predetermined reference conditions when the PDO item is unchangeable.

11. The method of claim 7, wherein connecting to and operating the slave device comprises connecting to and operating a relevant slave device when a slave device possessing the operating transmission PDO list or the operating reception PDO list is present.

12. The method of claim 7, further comprising the master device downloading the operating transmission PDO list or the operating reception PDO list corresponding to identity information of the slave device to the corresponding slave device; and connecting to and operating the corresponding slave device when a slave device possessing the operating transmission PDO list or the operating reception PDO list is not present.

\* \* \* \* \*